United States Patent
Bertani

(10) Patent No.: US 11,263,294 B2
(45) Date of Patent: Mar. 1, 2022

(54) APPARATUS AND METHOD FOR VERIFICABILITY /AUDITABILITY OF CORRECT PROCESS EXECUTION ON ELECTRONIC PLATFORMS

(71) Applicant: PROVABLE THINGS LIMITED, Wimbledon (GB)

(72) Inventor: Thomas Bertani, London (GB)

(73) Assignee: Oraclize Limited

( * ) Notice: Subject to any disclaimer, the term of this patent is extended or adjusted under 35 U.S.C. 154(b) by 100 days.

(21) Appl. No.: 16/631,438

(22) PCT Filed: Jul. 18, 2018

(86) PCT No.: PCT/GB2018/052034
§ 371 (c)(1),
(2) Date: Jan. 15, 2020

(87) PCT Pub. No.: WO2019/016549
PCT Pub. Date: Jan. 24, 2019

(65) Prior Publication Data
US 2020/0210554 A1 Jul. 2, 2020

(30) Foreign Application Priority Data
Jul. 21, 2017 (GB) ..................... 1711788

(51) Int. Cl.
*G06F 7/04* (2006.01)
*G06F 12/00* (2006.01)
(Continued)

(52) U.S. Cl.
CPC ............ *G06F 21/125* (2013.01); *G06F 21/44* (2013.01); *G06F 21/53* (2013.01); *G06F 21/602* (2013.01); *G06F 21/645* (2013.01)

(58) Field of Classification Search
CPC ........ G06F 21/125; G06F 21/44; G06F 21/53; G06F 21/602; G06F 21/645;
(Continued)

(56) References Cited

U.S. PATENT DOCUMENTS

2011/0302415 A1* 12/2011 Ahmad ................. H04L 9/0825
713/168
2012/0166795 A1* 6/2012 Wood ...................... G06F 21/57
713/155
(Continued)

FOREIGN PATENT DOCUMENTS

WO WO-2018162060 A1 * 9/2018 ............. G06F 21/57

OTHER PUBLICATIONS

Lauer et al., Hypervisor-based Attestation of Virtual Environments, 2016. (Year: 2016).*

(Continued)

*Primary Examiner* — Trong H Nguyen
(74) *Attorney, Agent, or Firm* — Thorpe North & Western, LLP.

(57) ABSTRACT

An apparatus comprises a logic processor and at least one hardware device the processor being configured to orchestrate at least one virtual machine, wherein each device and virtual machine respectively forms an isolated execution environment, the processor being configured to: generate a unique ID associated with the request for the result; commit to the unique ID; transmit to the data source the request for data, to trigger the data source to generate and return the result and to generate an authenticity proof of the result by leveraging at least one software attestation technique or at least one hardware attestation technique; verify the authenticity proof; and transmit to the remote application the returned result and verified authenticity proof. This apparatus can be used to provably enforce the correct execution of (Continued)

a given process without relying on the security of a single isolated execution environment only.

12 Claims, 6 Drawing Sheets

(51) Int. Cl.
    *G06F 12/14*     (2006.01)
    *G06F 13/00*     (2006.01)
    *G11C 7/00*     (2006.01)
    *G06F 21/12*     (2013.01)
    *G06F 21/44*     (2013.01)
    *G06F 21/53*     (2013.01)
    *G06F 21/60*     (2013.01)
    *G06F 21/64*     (2013.01)

(58) Field of Classification Search
    CPC ... H04L 63/126; H04L 63/123; H04L 9/3239; H04L 2209/38; G06Q 2220/00; G06Q 20/223; G06Q 20/36
    See application file for complete search history.

(56) References Cited

U.S. PATENT DOCUMENTS

2016/0366185 A1* 12/2016 Lee ................... H04L 9/3236
2019/0138729 A1* 5/2019 Blundell ............ G06F 9/45558

OTHER PUBLICATIONS

Fan Zhang et al.: Town Crier: An Authenticated Data Feed for Smart Contracts; Computer and Communications Security, ACM, 2 Penn Plaza, Suite 701, New York, NY 10121-0701 USA; Oct. 24, 2016; pp. 270-282, XP058298935; DOI: 10.1145/2976749.2978326; ISBN: 978-1-4503-4139-4; p. 271, line 1ff; Section 2. "Background" Section 6. "The TC Contract".

* cited by examiner

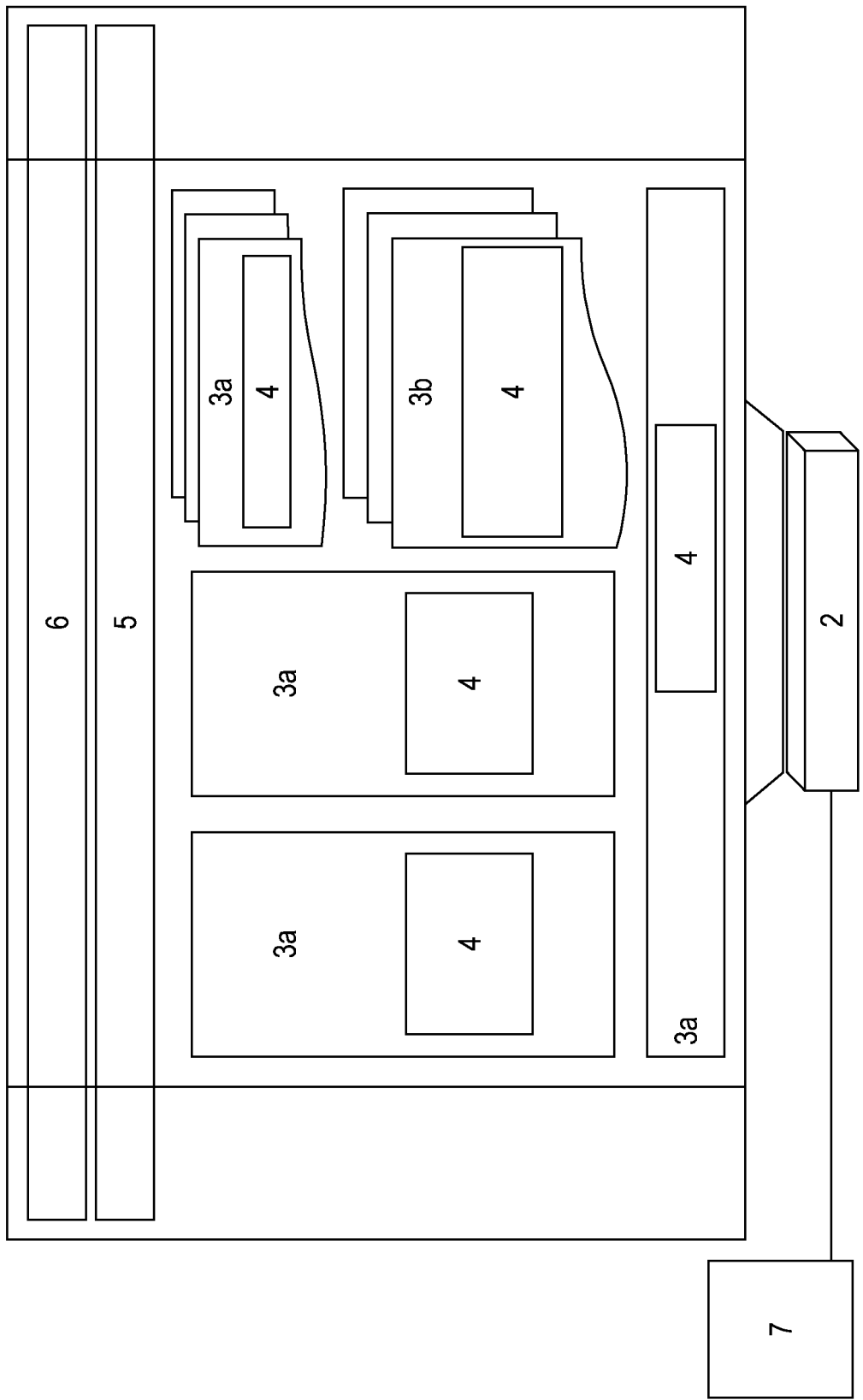

APPARATUS AND METHOD FOR VERIFICABILITY /AUDITABILITY OF CORRECT PROCESS EXECUTION ON ELECTRONIC PLATFORMS

TECHNICAL FIELD

The present invention relates to the field of digital security and particularly to data transfer and attestation.

BACKGROUND

Modern electronic platforms enable the efficient execution of a number of processes, whose steps are embodied in software components running on the electronic platforms themselves.

When processes are executed on behalf of a third party or when they involve stakes by third parties, it is important to prove their correct execution and to enable the auditability and verifiability of such proof.

An example of such process may be in the field of public tenders, specifically e-procurement. In such situations, the security guarantees provided by the existing platforms only refer to the origin and integrity of the submitted offers by leveraging digital signatures, while further guarantees on the confidentiality of the offers, which, by law, cannot be disclosed before the tender termination date is reached, would be needed to both improve the process as a whole and reduce the risk of any leaks.

Another example is providing to a third party a proof of reserve of a bank account: for example, simply taking a screenshot of the balance the bank website is not enough, since the image could be tampered with. Even recording the full HTTP traffic from the bank website would not be sufficient: although communications between the client and the bank server are protected with regards to confidentiality, origin and integrity by the Transport Security Layer (TLS) protocol, through the use of encryption and digital signatures, those properties are not transferable to a third party.

These limitations are especially important for blockchain applications and smart contracts, which cannot fetch external data by themselves and therefore require an actor connected both to the blockchain context and to the external context to send it. If their strong security model is to be maintained, then trusting an unknown external actor to send the correct, untampered data from the required data source is not viable.

Yet another example is the process of generating untampered random numbers, both in the traditional and online gambling industry.

Even in the cases where processes are self-executed, an auditable proof of such execution may be important: for example, in the case of system monitoring and logging a trail of the monitoring.

Currently, in most cases, the platform operator handling the process is completely trusted. Violations of the correct process execution, when and if are found, are resolved via legal means, with increased costs and a non-deterministic outcome of the dispute resolution.

In the best cases, the platform operator and the software embodying the process steps are audited and certified, but these certifications alone cannot guarantee a match between what was audited and what ultimately runs on the platform. If the operator of the platform turns malicious or if the platform security is compromised, the process execution could be tampered with.

It is to these problems, amongst others, that the invention attempts to offer a solution.

SUMMARY OF INVENTION

In an independent aspect, there is provided an apparatus comprising a logic processor and at least one hardware device, the processor being configured to orchestrate at least one virtual machine, wherein each device and virtual machine respectively forms an isolated execution environment, the processor being configured to:

generate a unique ID associated with the request for the result;

commit to the unique ID;

transmit to the data source the request for data, to trigger the data source to generate and return the result and to generate an authenticity proof of the result by leveraging at least one software attestation technique or at least one hardware attestation technique;

verify the authenticity proof; and transmit to the remote application the returned result and verified authenticity proof. The apparatus enables proving the correct execution of a number of processes, embodied on software, running on electronic platforms.

The apparatus comprises a number of components of software and hardware nature which provides strong guarantees of the safe and correct execution of different processes. The enforcement is done by leveraging multiple attestation technologies, both software and hardware based. By chaining multiple attestation techniques, higher security guarantees of correct execution of a process can be provided. A proof of correct execution, auditable and transferable to a third party, is delivered to the receiving party and it is henceforth called 'authenticity proof'.

A "data source" (of "data provider") represents any logical component (either internal or external to the apparatus) which, given a specific query for data, returns a relevant output called the "result". This result is typically a crucial part of the process to secure.

With respect to the e-procurement aforementioned examples, the apparatus enables the confidentiality of the offers with respect to the platform operators to be maintained thanks to timelock encryption. The timelock encryption process produces a proof which demonstrates that the encrypting key can only be accessed by the platform operator for decryption on a future date. In this case the relevant data source is an application generating the encryption and decryption keys.

Where authenticity of data originating from web server is needed, the apparatus can produce a proof by proving that the TLS connection was completed in an auditable environment where the key used to secure the encrypted channel cannot be accessed, it is possible to show to a third party a non-repudiable proof of any web server response.

The apparatus, namely the "proprietary engine" (also referred to as the "engine"), therefore generates security guarantees, which can be leveraged for different purposes with the aim to improve the transparency of certain processes. The engine is composed by both hardware and software components, which are managed by a piece of software known as logical processor. This processor manages the virtual machine instances and the hardware devices managed or manufactured by third parties, called "attestators", which provide guarantees of correct execution equivalent to an isolated computation environment.

Advantageously, the data source and isolated execution environment may be separated. This approach allows remote applications to interact with any data source via standard channels. The authenticity proofs provide strong guarantees regarding the authenticity of the data so that applications can be certain of a requested data being transmitted, without modifications, from the data source it was requested from. Additionally, requested data can be combined with more than one authenticity proof, each of those preferably relying on a different attestator and leveraging a different attestation technique in order to increase the overall security.

In a dependent aspect, the hardware device or virtual machine comprises the data source, and the authenticity proof is generated with the assistance of the hardware device or virtual machine. Alternatively, the data source is an external device/data source which is remote to the apparatus and the authenticity proof is generated in cooperation with the external device.

Accordingly, the data source is either internal or external to the apparatus, increasing the breadth of applications in which the apparatus is used.

In a dependent aspect, the request, meaning a query for a data or for an execution's result sent to the engine, comprises an indication of the data source for generating the result. Advantageously, therefore, the user can select the data source.

In a dependent aspect, the processor is further configured to select the data source for generating the result. Advantageously, the data source may be efficiently selected by the logic processor.

In a dependent aspect, a hardware device or virtual machine is configured to run at least one custom application for leveraging hardware and/or software attestation techniques. Advantageously, custom applications may be designed to leverage device-specific features in a way which enables the secure execution of a process. Preferably, the custom application further commits to a unique ID, a unique identification string referring to a specific request sent to the engine, where the commitment by the custom application is auditable via the authenticity proof. Further preferably, two or more custom applications are combined by parallelization, concatenation or nesting. By combining the custom applications designed for each device or technology (virtual machine), it is possible to reach an even higher level of security.

In a dependent aspect, the request for the result comprises a request for a configuration of the authenticity proof. This provides an advantage in that the most appropriate authenticity proof may be selected to improve security.

In a dependent aspect, generating an authenticity proof comprises generating multiple, independent, authenticity proofs. Leveraging multiple attestation techniques achieves a higher level of security compared to guarantees provided by one in itself. In particular, if the attestation techniques are implemented by competing manufacturers, the overall security is improved as any eventual shortcoming of one techniques is compensated by the others.

In a dependent aspect, generating the result comprises repeating a computation of the result until a condition or a series of conditions are met. Accordingly, computation of the result may be iterative. For example, the recurrent verification of certain data may be returned just when a given threshold is reached. In such situations an authenticity proof is produced at the end of the computing process or at the completion of each relevant computation step.

In a dependent aspect, the remote application is at least one blockchain application. Advantageously, the apparatus provides a high security layer which enables delivery of data to the blockchain applications, delivering authenticity proofs which represent strong cryptographic guarantees protecting against data tampering. Further advantageously, the apparatus enables the complexities of directly integrating with blockchain protocols and networks to be hidden from the data provider.

In a dependent aspect, the request comprises a query for a random number. Advantageously, this provides a mechanism for provable fair random number generation.

In a dependent aspect, the request comprises a query of an encryption key and a decryption key. Advantageously, this can provide improved security guarantees in the field of public tenders such as e-procurement, reducing the risk of any leaks.

In a dependent aspect, the request comprises a query for the execution of a specific custom process, increasing security.

In a dependent aspect, there is provided a system including a plurality of distributed servers, each server comprising an apparatus as described above. Including a network of servers increases the security of the system.

Accordingly, the present invention may involve a distributed architecture composed of servers and devices, both local and remote, manufactured or managed by different players. The architecture enables the service to enforce the correct execution of a process benefiting a receiving party. The enforcement is done by leveraging multiple attestation technologies, both software and hardware based. By chaining multiple attestation, higher security guarantees of correct execution of a process can be provided. A proof of correct execution, auditable and transferable to a third party, is delivered to the receiving party and it is henceforth called authenticity proof.

In a further independent aspect, there is provided a method comprising the steps of:

providing a processor and at least one hardware device, the processor being configured to orchestrate at least one virtual machine, wherein each device and virtual machine respectively forms an isolated execution environment;

generating a unique ID associated with a specific request for a data or an execution's result;

committing to the unique ID;

transmitting to the data source the request for data, to trigger the data source to generate and return the result and to generate an authenticity proof of the result by leveraging at least one software attestation technique or at least one hardware attestation technique;

verifying the authenticity proof; and transmitting to the remote application the returned result and verified authenticity proof.

BRIEF DESCRIPTION OF FIGURES

Examples of the present invention will now be described with reference to the accompanying drawings, where:

FIG. 2 shows an example of an engine ("proprietary engine") according to an embodiment of the invention;

DETAILED DESCRIPTION

Figure 1:
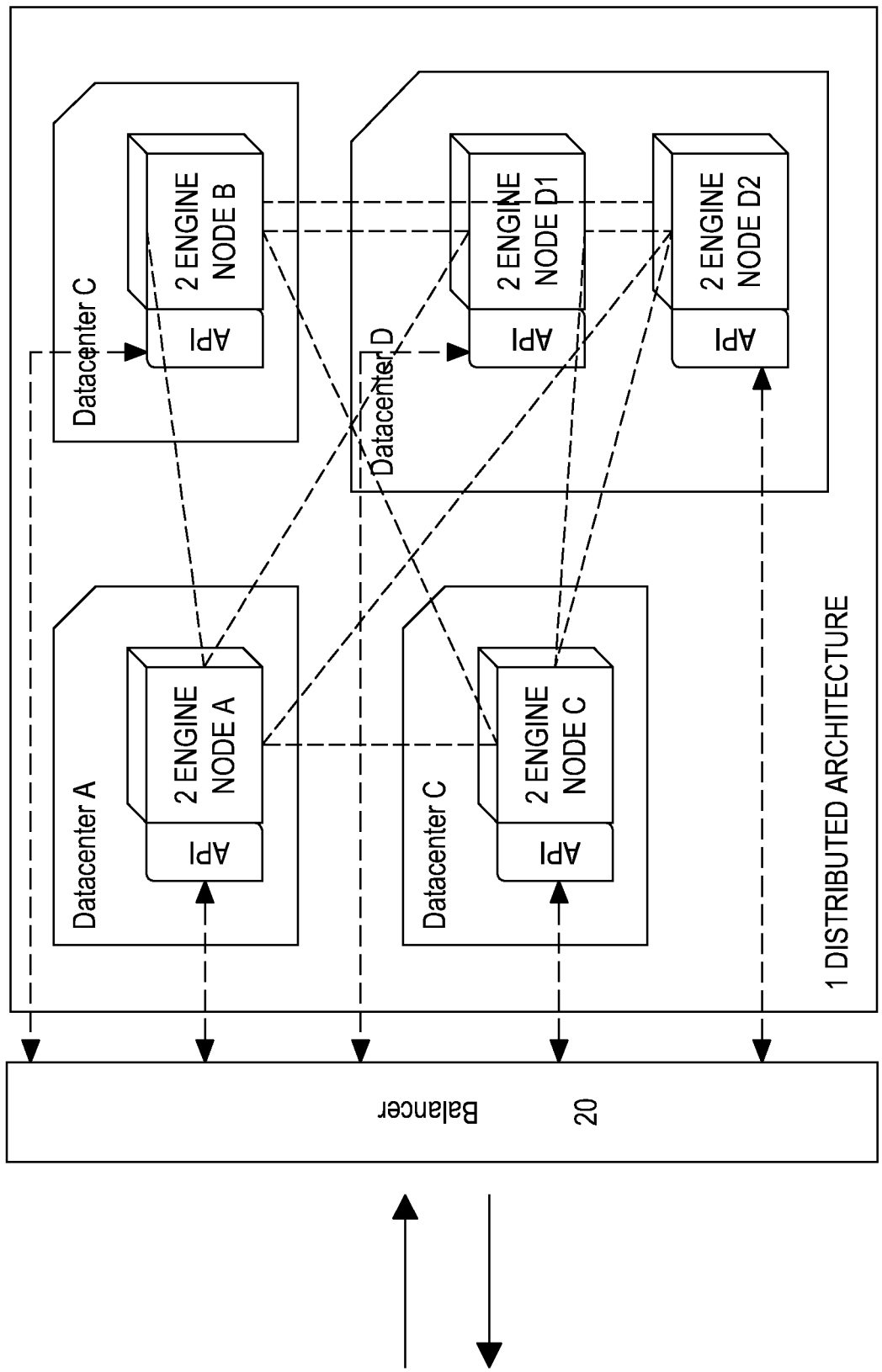
FIG. 1 shows a distributed system according to an exemplary embodiment of the invention.

Turning first to FIG. 1, there is shown an example of deployment for a system implementing a distributed architecture 1 composed of engine nodes 2 (A, B, C, D . . . etc) and a workload balancer 20 (workload managing unit).

The workload balancer 20 distributes API requests to the different engine nodes 2, taking in consideration the current load of each node 2.

The engine nodes 2, each of them being the apparatus presented in this document, may be hosted in multiple data centres and each data centre may include one or more of the distributed nodes in the system for additional redundancy and they are in continuous communication with each other via authenticated and encrypted communication channels.

FIG. 2 schematically shows an example of an engine 2 which comprises an API layer 6 and software layer 5 running on a physical server, multiple hardware devices 3a and a number of remote and local auditable virtual machines instances 3b, all communicating with each other via the software layer 5. The engine 2 acts as an "oracle" which provides data to an application 7, as will be described in more detail below.

Each hardware device 3a has a physical micro-processor featuring support for Trusted Execution Environments (TEE) and attestation of its properties. A TEE is an isolated computation environment separated from the main computation environment, where the device's main operating system and user-space application runs.

Ensuring security of the main operating system (OS) is often difficult, because of the large amount of code comprising modern OSs which represents a large attack surface. The separation between the two can be enforced both through hardware and software mechanisms. This guarantees that programming instructions and data loaded inside the TEE are protected with respect to confidentiality and integrity, even in the event of a compromise of the main operating system. For example, third party applications handling password, cryptographic keys and sensitive user information for authentication can run within the TEE with stronger guarantee that no information is ever leaked to external attackers.

The communication between the secure application running on the TEE and the main operating system is done through a strict application programming interface aimed to reduce the attack surface. If a secure application requires some secret data of which confidentiality must be maintained (e.g. a private key), a process called provisioning can be initiated between the secure application and a remote server which entails the opening of an encrypted and authenticated channels between the two. In order to do so, the secure application must prove its identity to the remote server, a process which requires an attestation of the application, which can be either locally or remotely generated.

The attestation is a process during which the TEE proves either its trustworthiness or the trustworthiness of a specific secure application to a remote party. Often it entails the generation of an attesting document, called quote, which lists relevant information regarding the device, its TEE and, if required, the secure application. For example, it could include the secure application's binary hash (codehash) and the public part of key pair owned by and kept within the secure application, making possible to establish a secure channel to the application later.

The attestation document is then signed by a special attesting key, generally fused into the hardware during the manufacturing process, and which can only be controlled by the TEE. This key is often referred to as the hardware root-of-trust. The attesting key's certificate is then signed by the master key of the producer of the device. The remote server can then verify the entire chain, and provision the secret only if all the signatures are verified and none of the keys involved have been revoked by the manufacturer. The attestation mechanism can therefore be used to prove that a given application code is running on the device, with such device being safe according to the best knowledge of the attestator.

TEEs offer stronger guarantee of security, but they can be compromised if an implementation flaw in the hardware or software is found. To increase safety, redundancy is required. Therefore preferably, the engine 2 combines multiple devices 3a provided by competing manufacturers selected to support different types of TEEs. In this example one (or more) Intel® device, which supports a type of TEE, namely Intel® Software Guard Extensions (SGX) Enclaves™, one (or more) Google™ smartphone device, one (or more) Ledger™ device, and one (or more) Samsung™ smartphone device, and one or more Trusted Platform Module (TPM) devices.

Each hardware device 3a has a support for custom applications. Within the engine 2 each hardware device 3a runs custom applications 4, leveraging specific device features and, in different ways, the device's TEE.

Specifically, in this example the Google™ device 3a is a smartphone device running Android™ Operative System, which provides: 1) Android™ Hardware Keystore and Hardware Attestation, and 2) Google SafetyNet™ Software Attestation APIs. The software attestation is leveraged to guarantee the integrity of the Android™ device and in particular that the operative system has not been compromised. The hardware attestation enables additional security guarantees than the ones provided with the sole software attestation. Specifically, to prove that: 1) the key pair identifying the device and used for authentication of the device response is truly generated and contained in a TEE, 2) the device bootloader is verified and locked, and 3) the device is updated to the most recent security patch level and OS. That is, the attesting key will sign a document listing this information and the key is signed by a Google™ owned key-pair. The Google™ device 3a runs at least one custom application 4, which leverages both the abovementioned Android™ Hardware Keystore and Hardware Attestation and Google™ SafetyNet Software Attestation.

The Intel®, SGX-enabled device can run custom secure applications called Enclaves™ These Enclaves provide high guarantees of confidentiality and integrity of the data they contain and attestation can be used to prove the correct execution of the code they are constituted of. The Intel® SGX-enabled device 3a runs at least one custom application 4, which leverages the Enclaves™ properties.

The Ledger™ device 3a features a System-On-Chip, comprising of a TEE which supports third-party developed applications (among which cryptocurrency wallets or custom applications 4), and attestation in a similar manner as described above. The Ledger™ device 3a runs at least one custom application 4, which leverages the features of the Ledger™ TEE.

The engine 2 is also comprised of a number of virtual machine instances 3b, constructed to offer guarantee of correct execution equivalent to an isolated computation environment. The virtual machine instances can run locally on the physical server CPU and leverage different forms of local attestation (e.g. Microsoft® Hyper-V Shielded VMs) or remotely in a cloud provider infrastructure (e.g. Amazon® Web Service) with remote attestation.

The virtual machines run custom applications 4: in the example shown in FIG. 2, one (or more) Amazon® Web Service virtual machine 3b. For example, one type of custom application 4 can be PageSigner™, which leverages the TLSNotary technique (https://tlsnotary.org/TLSNotary.pdf) to notarize an authenticated web page or API accessible via HTTPS.

Accordingly, devices 3a and virtual machine instances 3b located in the engine 2 implement hardware and/or software attestation, meaning that the devices provide either guarantees coming from the hardware and/or guarantees coming from the software. The manufacturers or providers of such devices 3a or virtual machine instances 3b are the so-called "attestators"—independent, reputable parties offering the attestation techniques leveraged within the engine. Advantageously, both hardware and software attestation techniques are leveraged to provide higher security guarantees to end-users. It will be appreciated that the specific technology leveraged is not essential and that alternative or additional attestation techniques (either hardware or software based) may be leveraged and included in the infrastructure. Additionally, a number of attestation techniques may be combined to achieve a higher level of security compared to guarantees provided by one in itself. In particular, if the attestation techniques are implemented by competing manufacturers, the overall security is improved as any eventual shortcoming of one techniques is compensated by the others. A result can thus have more than one authenticity proof, each of them being independent.

Each device 3a or virtual machine 3b can be used to run different custom applications 4. The custom applications are designed to leverage device-specific features in a way which enables the secure execution of a process. With reference to the use-cases discussed in the previous paragraphs, the first one to attest the authenticity of data delivered to the blockchain context, the second custom application provides guarantees on the confidentiality of offers in the context of public tenders and the last one enforces and ensures the correct execution of a certified code for entropy generation. The custom application 4 is used to interact and leverage the different attestation techniques associated with a devices 3a or a virtual machine instance 3b, with the aim to enable communication between the different attestation techniques and a software layer 5 sitting on top of the engine 2.

Figure 3:
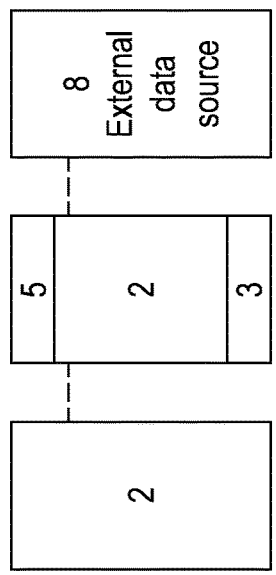
FIG. 3 shows a system according to an embodiment of the invention.

To illustrate the operation of the custom applications 4 and software layer 5, methods in accordance with embodiments of the invention are now described with reference to FIG. 3 and FIG. 4A.

An engine 2 (which may be part of a distributed architecture 1 as shown in FIG. 1), as described above executes a given process and provides third party auditable proofs of correct execution called authenticity proofs.

For example, the engine 2 acts as a secure data-carrier to connect an application 7, to another interface 8 such as a Web API or Web page which represents an external data source (data provider). Accordingly, the engine 2 acts as an "oracle" which provides data to an application 7 which cannot effectively "fetch" the data itself or it would like to access those data with a third party auditable proof of the process.

In some cases, one of the custom applications running on devices 3a or virtual machine 3b could implement an internal data source (data provider). An example of this is the so called "auditable-computation" data source, which enables a secure and transparent delegation of a script to a custom application 4 within the engine 2.

A different example considering the cases where it is desirable to achieve provably fair random number generation, the engine 2 is leveraged for the entropy generation itself through the relevant custom application to produce randomness while proving the actual execution of the proved-to-be-fair entropy generation code.

In other examples, the applications 7 are leveraging or interacting with blockchain protocols as it will be described in more detail in the dedicated section below.

A method 100 according to an embodiment of the invention will now be described with reference to FIG. 4.

At step 110, when an API request ("query") is made by the digital platform 7 to the system, it is sent to the software layer 5 running on a specific engine 2. The query may represent a request for data, a request for result computation, a request for action execution or a combination of the three. In the blockchain context a query will often represent a request of connection with a different environment, for example the Web. In the case of entropy generation, the query represents a request for a provably-fair draw of random number sequence. Referring to public tenders, the query represents a request of encryption and decryption keys.

At step 120, the software layer 5 produces a unique ID which identifies a specific query and is attached to the query itself and returned immediately to the digital platform 7 as receipt of the request. At step 130, the software layer 5 commits internally to the unique ID of the query and stores the query ID and the query parameters in the database and at step 140, if it is supported, the unique ID is further committed by the custom application. The commitment to a query's unique ID benefits the transparency of the process by preventing malicious behaviours and by making the process auditable through the authenticity proof. For example, when a query requiring a random number is sent to the system, in order to prevent the system calculating the random number several times (until it gets a satisfying result), the unique ID of the query is checked against a list of served queries maintained within the TEE's device and further requests with the same unique ID are not accepted.

At step 140, the software layer 5 triggers computation of the result (i.e. the answer to the query) and at step 150 the result is computed.

The computation may take place in two different ways, depending on the requirements. Specifically, the output may be produced by a dedicated custom application 4, in which case the result is generated directly on the device 3a or on a virtual machine 3b.

Alternatively, the data source is the external data provider 8 (such as a Web API), in which case the result is produced by an external data provider which is "fetched" (i.e. transmitted) by the engine 2 with the cooperation of a custom application 4 running on the device 3a or the virtual machine 3b. For example, the "Android proof" custom application 4 leveraging the Android™ Hardware Keystore and Hardware Attestation and Google™ SafetyNet Software Attestation running on the Google™ device or the PageSigner™ custom application 4, which leverages the TLSNotary™ technique running on an Amazon Web Service virtual machine instance.

This cooperation between the custom application 4 running on device 3a or one of virtual machine 3b and the external data source 7 enables the creation of an authenticity proof of data fetched from the external data source 7. This may be accomplished by performing an auditable TLS connection, as the one provided by the TLS Notary protocol.

At step 160, the software layer 5 of the engine verifies the validity of the authenticity proof before sending the result to the digital platform 6. This verification includes checking whether the result is bound to a specific query and its unique ID. Preferably, there is continuous communication between the elements 3 and the engine 2. Computation of the result may be iterative. For example, the recurrent verification of a certain data may terminate and return a result just when one or a series of given conditions (e.g. thresholds) are met; these conditions may be connected by logical operators. This is very flexible and can be leveraged in different ways. With reference to the abovementioned public tenders use-case, the decryption key to be used for the opening of the offers is released as soon as the predefined deadline is met. This is done by continuously checking whether the deadline is met or not.

At step 170, the software layer 5 sends back to the user both the result and the authenticity proof which represents a strong and auditable cryptographic guarantee protecting against data tampering.

Figure 6:
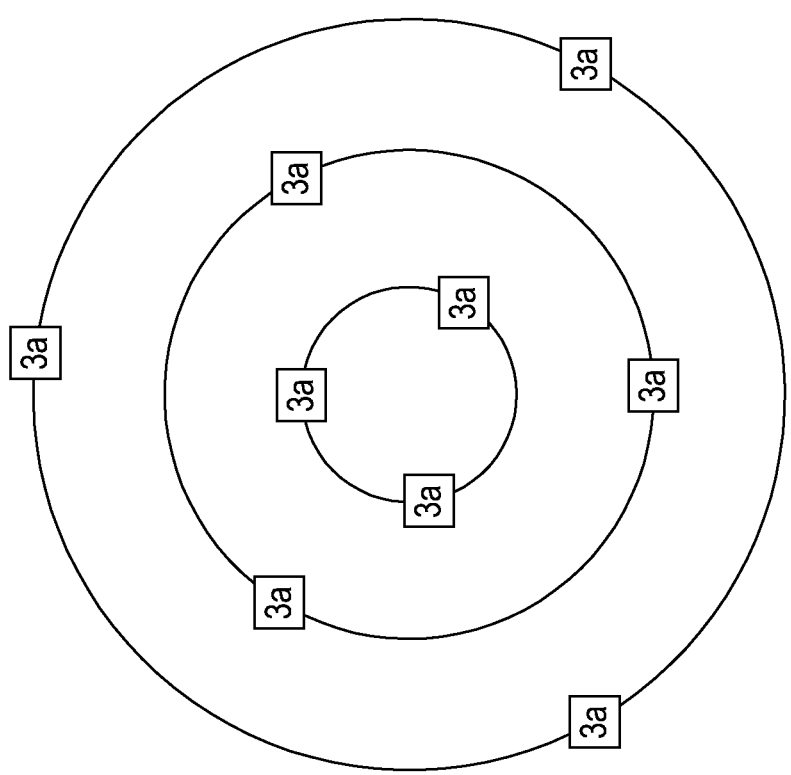
FIG. 6 shows an example of how multiple authenticity proofs could be combined.

For a particular request, more than one authenticity proof may be generated. This authenticity proof ultimately proves the auditable and transparent cooperation between the apparatus and the abovementioned "attestator", the manufacturer or provider of the devices 3a or virtual machine instances 3b leveraged within the engine. Therefore the engine cannot go on unnoticed in tampering with the data it delivers. Where several authenticity proofs are produced, they are preferably independent (by several devices). Leveraging a number of attestation techniques achieves a higher level of security compared to guarantees provided by one in itself. In particular, if the attestation techniques are implemented by competing manufacturers, the overall security is improved as any eventual shortcoming of one techniques is compensated by the others. A result can have more than one authenticity proof as shown in the example FIG. 6, where three different authenticity proofs are chained in sequence. For example, in FIG. 6, the devices 3a in the inner-most circle are Ledger™ devices, the devices 3a in the middle-circle are Android smartphone devices 3a, and the devices 3a in the outermost circle are Intel® SGX-enabled devices 3a. It will be appreciated that, in the example FIG. 6, more devices 3a are shown as part of the architecture to provide extra redundancy.

Accordingly, the software layer 5 sitting on top of the hardware infrastructure abstracts the multiple hardware and software attestation techniques being leveraged. Advantageously, the end-application (i.e. a blockchain application or a traditional lottery application) does not have to handle the complexity of neither the hardware/software attestation techniques nor the multiple ad-hoc custom applications. On one side the software layer 5 receives information from each custom application 4 sitting on each device 3a or virtual machine/technology 3b, while on the other side it provides information in a simple and standard way to the end-application.

Whilst each type of proof of authenticity is specific on the technology, the engine is technology agnostic in that a user does not see the complexity of each technology being used. This generality is achieved by specific plugins and communication with each device. There is continuous communication in between the software layer 5 and each device 3a, 3b. A communication in between devices/technologies comprised within the engine 2 can exist as well, but this is always reached via the software layer 5 acting as a middleman.

The devices 3a are all physical devices composing the engine 2, while the technologies 3b are virtual machines composed in the node.

The communication between the devices 3a and 3b and the software layer 5 is different according to the technology leveraged. In general, the software layer 5 controls the different technologies and leverages them according to the queries it receives.

Furthermore, the specific way in which the technologies are leveraged generates strong guarantees on the security of an action or a process. It will be appreciated that the security model provided by such infrastructures can be applied to multiple processes and situations.

Leveraging multiple hardware and software attestation techniques provides an overall higher level of security compared to known mechanisms. Implementing custom applications 4, according to the objective of each of those, leverages and combines in an effective and efficient way the hardware and/or software attestation techniques to improve the security level of specific processes. Custom applications 4 are built on the top of those hardware and software attestation techniques and are designed to address the specific use-cases we mentioned in the paper. For example, with reference to the random number generation use-case, there is a custom application 4 running on the Ledger™ device and leveraging the Ledger™ attestation technique to generate entropy and the relative authenticity proof.

Furthermore, by combining the custom applications 4 designed for each device 3a or technology 3b it is possible to reach an even higher level of security. The combination of multiple technologies might be achieved by parallelizing them, by executing them in sequence, by using them as a matryoshka (nesting) doll or other configurations. Additionally, the different devices 3a comprising the architecture have different properties/features. For example, some devices 3a may offer software attestation and some limited form of hardware attestation, while other may offer a complete hardware attestation. The custom applications 4 can leverage these attestations in different/specific ways.

The end-user could use a hardware or software attestation technique directly to secure the correct proceeding of a given process, but this would entail the user to develop a custom application, leveraging one of those attestation techniques for the process, which is a complex undertaking. The software layer 5 enables users to leverage multiple technologies to secure the correct execution of a process (examples) thanks to an application interface API 6. The user can send a request to the API 6, referring a number of parameters which depends on the process she/he wants to secure.

Figure 4A:
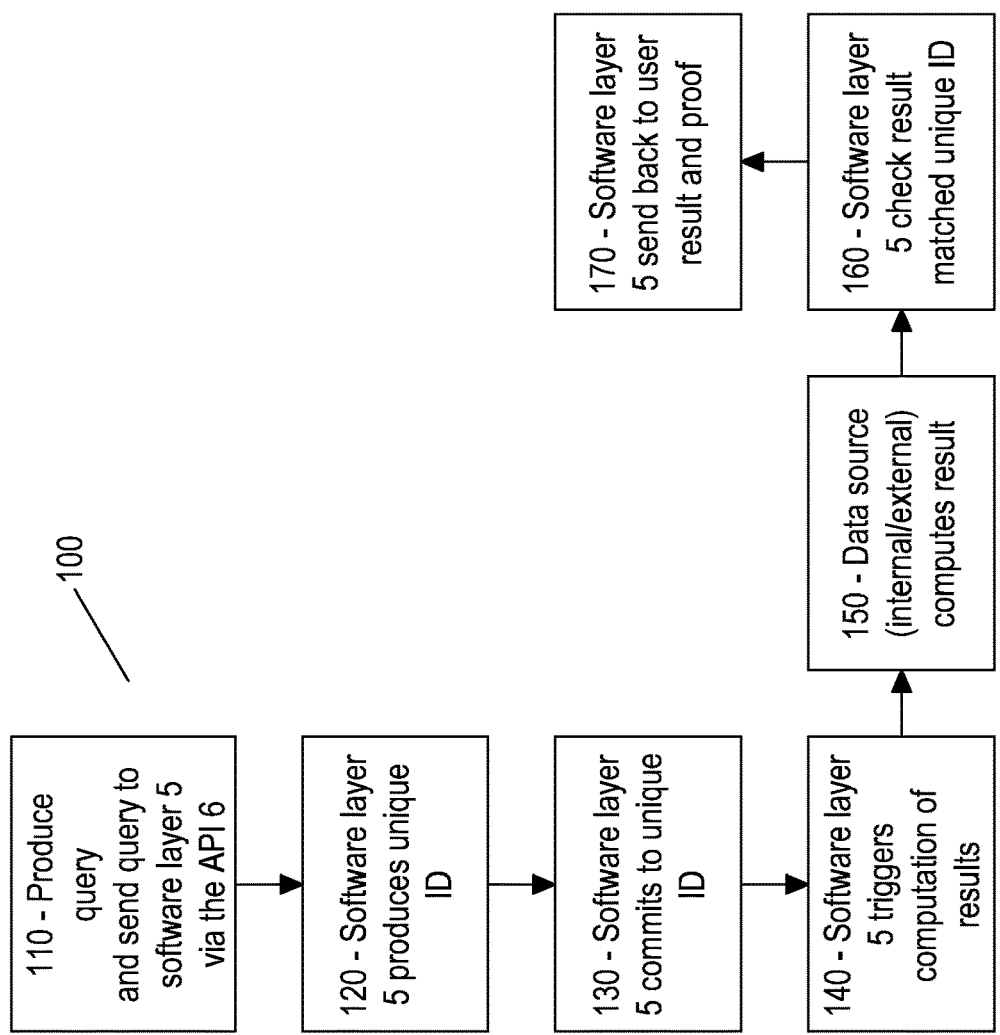
FIG. 4A shows a method according to an embodiment of the invention.
Figure 4B:
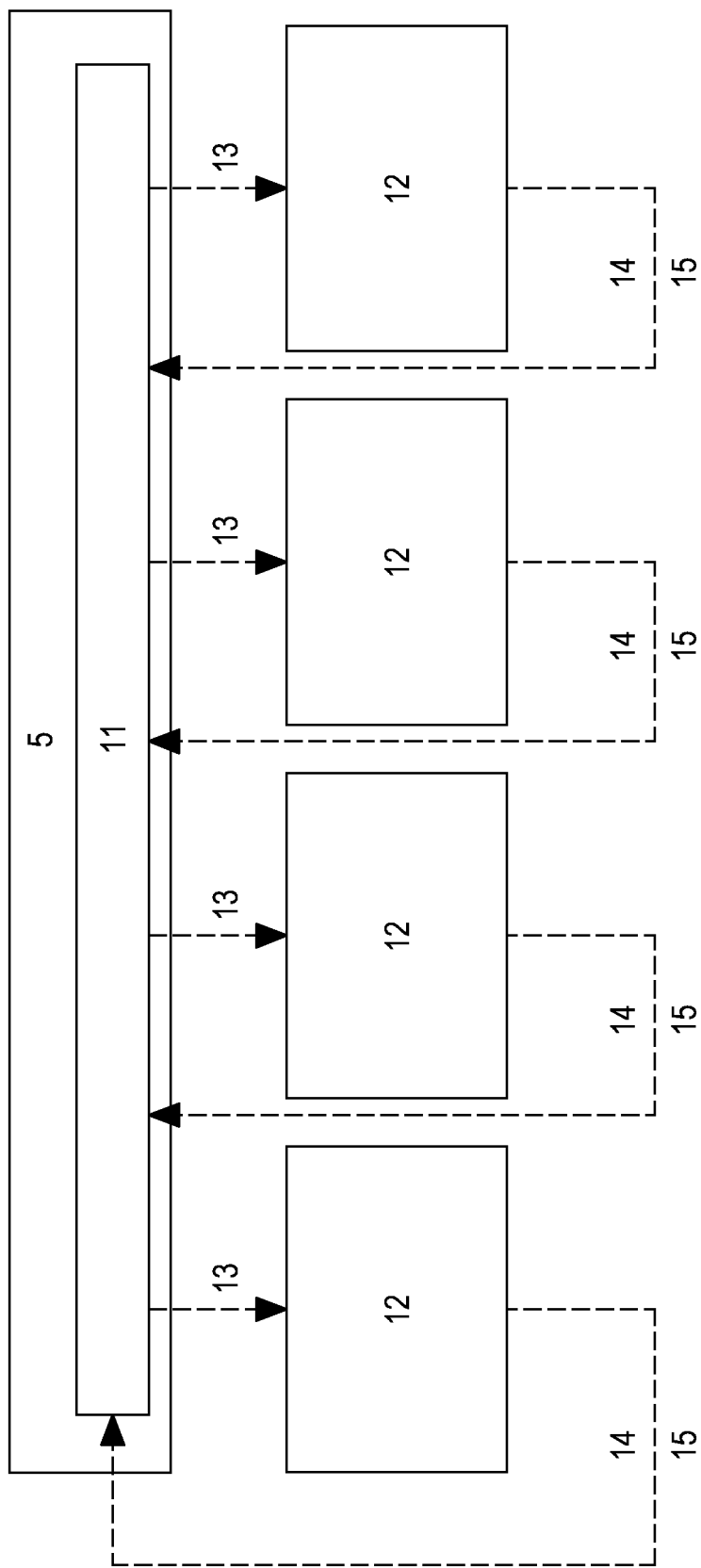
FIG. 4B shows an example of how computation of results is triggered.

With reference to FIG. 4B, there is described a sub-method of step 140 in method 100 described in FIG. 4A. The request parameters comprise an input called query 13, the data-source 12 to be used to interpret the query and the configuration required for the authenticity proof 15, namely the type or types of attestation techniques to be used among the available ones for the specific data-source 12 and the indications on where and how to return and archive the authenticity proof. Optionally, additional parameters can be specified (for example, future time the request has to be executed at, parsing helpers for post-processing the result).

The selection process of the data-source 12 to be used is orchestrated by a piece of software called logical processor 11, which is part of the software layer 5. Once the processor 11 has identified the requirements of the API request, it sends a query 13 to the correspondent data-source 12 (whose features do satisfy the requirements of the API request). The data-source 12 elaborates the query 13 in different ways according to the data-source 12 itself. Examples of this process will be provided below. As soon as the result 14 is ready, this is sent back along with the relevant authenticity proof(s) 15 to the processor 11, which is in charge of sending them back to the end-application/user.

For example, for the data transfer process the user sends as API request parameters a query 13 which is the URL of the specific resource to be accessed (Web APIs or Web page), the "URL" data-source 12, optionally along with the type of parsing and parsing path which has to be applied on the retrieved HTTP response (JSON, XHTML, XML), the configuration required for the authenticity proof 15 and, optionally a future time the request has to be executed at. In this scenario, the processor 11 would identify the API request as compatible with the "URL" data-source and therefore direct a query 13 to the relevant data-source 12. The data-source 12 would produce a result 14 along with an authenticity proof 15 according to the configuration requirements.

In further example applications, systems and methods according to embodiments of the invention may be used to securely enforce the opening of offers for public tenders not earlier than a predefined time. While submitting an offer to a public tender via a digital platform 7, a user wants to be sure that the offer will not be opened before the schedule. In the paper process, this is guaranteed via the sealing wax, which is used to close the envelope containing the offer. When moving to the paperless process, this guarantee is usually lost as e-procurement platforms only support digital signing and trusted timestamping of the offers, which only provide guarantees on the origin and integrity of the offer, but not on its confidentiality.

When using the systems and methods according to embodiments of the invention, the paperless process can have the same level of security as the paper one as the opening of the offer is enforced at a predefined time by leveraging cryptography and trusted execution environments. This result is achieved by encrypting the offer with a secret key held within the TEE and which can be disclosed only after the specified date is reached. To provide further security against the compromise of a single TEE implementation, an onion-like encryption mechanism can be envisaged, where multiple encryption layers whose keys are held within different TEE are used.

In a further example, systems and methods embodiments of the invention may be used to attest correct execution of fair random numbers generation (which, for example, could have applicability in the gambling industry). At present there are no provably fair random number generators (RNGs), as the match between a certified RNG and the RNG actually implemented for entropy generation cannot be proven. Using systems and methods according to embodiments of the invention, a higher level of security is possible as the correct and fair execution of a certified RNG can be enforced and proved to a third party via the authenticity proof.

Blockchain Applications

Figure 5:
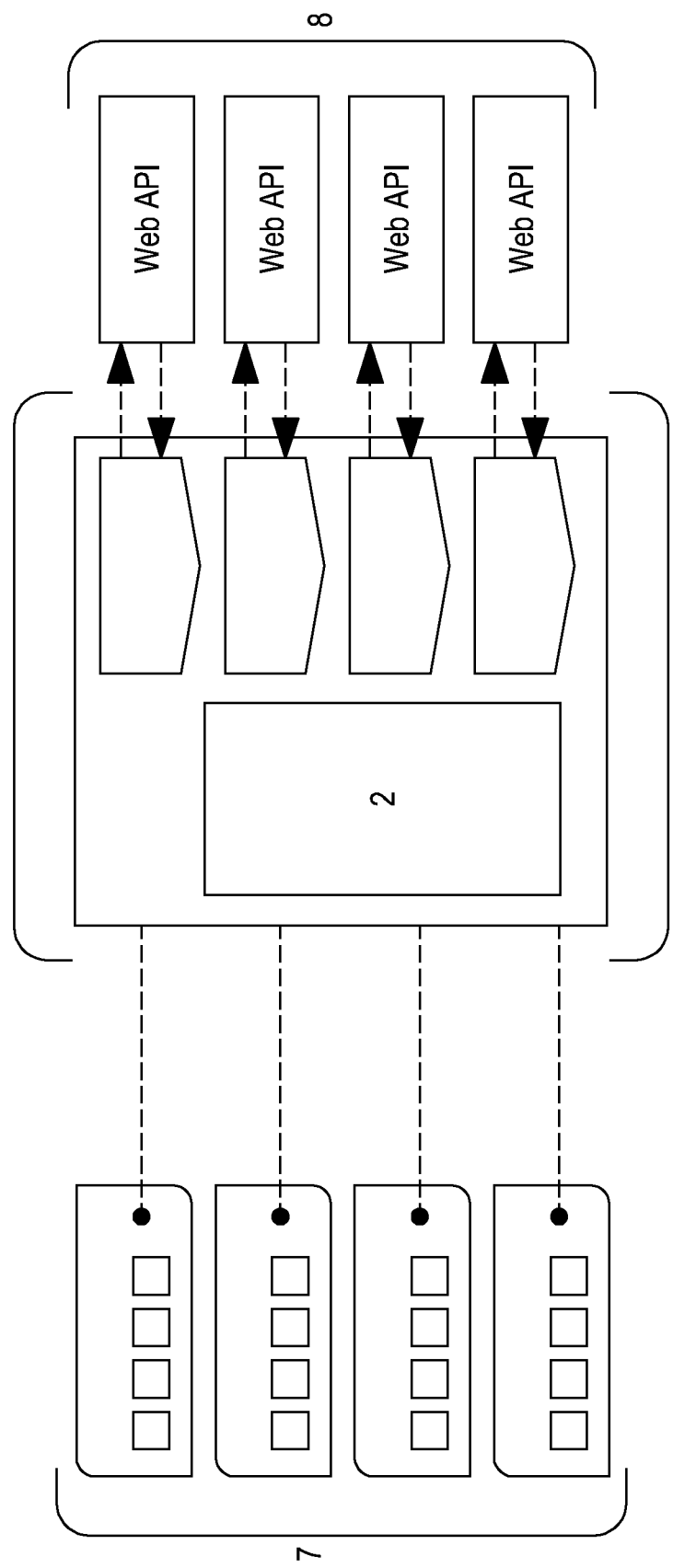
FIG. 5 shows an example of a server according to an embodiment of the invention in the context of blockchain applications.

The engine can be leveraged to connect different context, which natively do not or cannot communicate one with the other. With reference to FIG. 5, the engine 2 described above is used as a data-carrier connecting one or more blockchain applications 7 to Web APIs 8 in a standard, reliable and secure manner. In addition or alternatively to the Web APIs, different protocols such as IPFS or SWARM, or the "auditable-computation" data source may be used. Advantageously, the engine 2 implements a high security layer which enables delivery of data to the blockchain applications 7. As described above, along with data, the engine 2 delivers authenticity proofs representing strong cryptographic guarantees protecting against data tampering.

As may be seen in FIG. 5, integration of multiple blockchain platforms is supported. Advantageously, the blockchain complexity is hidden from the data provider 8 as the engine 2 takes care of it internally. When interacting with a blockchain platform, different activities have to be continuously handled by the user (i.e. setup of the blockchain nodes, acting accordingly in case improvements/modifications of the blockchain protocol occur, etc). This is replicated in different ways for all the blockchain platforms. The engine 2 takes care of all those activities. Therefore, the data provider 7 does not have to handle them.

Furthermore, there is no need for data providers 8 to be adapted technically as the engine 2 connects to already existing interfaces/APIs. The engine 2 thus represents a self-managed, distributed, blockchain-agnostic engine. The security guarantees provided by the engine 2 to blockchain applications 7 are very strong, when multiple hardware and software attestation methods are leveraged. For example, multiple authenticity proofs may be used, e.g. based on a TLSNotary™, on Trusted Computing and on signatures coming straight from the data provider.

The engine 2 can be connected to a variety of blockchain platforms via a thin connection layer, which is a simple adapter at the periphery of the apparatus redirecting blockchain-specific queries to the engine APIs, while remaining independent and blockchain-agnostic.

It will be appreciated that the use of the engine 2 in the blockchain application context represents just one type of use case, and the high security layer can be leveraged in non-blockchain environments as well.

It will be appreciated that the order of performance of the steps in any of the embodiments in the present description is not essential, unless required by context or otherwise specified. Thus most steps may be performed in any order. In addition, any of the embodiments may include more or fewer steps than those disclosed.

Additionally, it will be appreciated that the term "comprising" and its grammatical variants must be interpreted inclusively, unless the context requires otherwise. That is, "comprising" should be interpreted as meaning "including but not limited to".

Moreover, the invention has been described in terms of various specific embodiments. However, it will be appreciated that these are only examples which are used to illustrate the invention without limitation to those specific embodiments.

What is claimed is:

1. A computer-implemented apparatus comprising a software layer having a logic processor, the apparatus further comprising at least one hardware device, the processor being configured to orchestrate at least one virtual machine, wherein each of the at least one hardware device and each of the at least one virtual machine respectively forms an isolated execution environment, said each of the at least one hardware device and said each of the at least one virtual machine being configured to communicate with each other via the software layer, the software layer being configured to:

generate a unique ID associated with a request for a result;
commit to the unique ID;

transmit to a data source a request for data, to trigger the data source to generate and return the result and to generate multiple, independent, authenticity proofs of the result by leveraging at least one software attestation technique or at least one hardware attestation technique, wherein the data source is an external device which is remote to the apparatus and wherein the multiple, independent, authenticity proofs are generated in cooperation with the external device;

verify the multiple, independent, authenticity proofs; and transmit to a remote application the returned result and the verified authenticity proofs, wherein a hardware device or virtual machine is configured to run at least one custom application for leveraging hardware and/or software attestation techniques, wherein the request for the result comprises a request for a configuration of the multiple, independent, authenticity proofs.

2. An apparatus according to claim 1, wherein the request for the result comprises an indication of the data source for generating the result.

3. An apparatus according to claim 1, wherein the software layer is further configured to select the data source for generating the result.

4. An apparatus according to claim 1, wherein the custom application further commits to the unique ID and wherein the commitment by the custom application is auditable via the multiple, independent, authenticity proofs.

5. An apparatus according to claim 1, wherein two or more custom applications are combined by parallelization, concatenation or nesting.

6. An apparatus according to claim 1, wherein generating the result comprises repeating a computation of the result until a condition is met.

7. An apparatus according to claim 1, wherein the remote application is at least one blockchain application.

8. An apparatus according to claim 1, wherein the request comprises a query for a random number.

9. An apparatus according to claim 1, wherein the request comprises a query of an encryption key and a decryption key.

10. An apparatus according to claim 1, wherein the request comprises a query for an execution of a specific custom process.

11. An apparatus according to claim 1, wherein the apparatus is included in each of a plurality of distributed servers of a system.

12. A computer-implemented method comprising steps of:

providing a computer-implemented apparatus comprising a software layer having a logic processor and, the apparatus further comprising at least one hardware device, the processor being configured to orchestrate at least one virtual machine, wherein each of the at least one hardware device and each of the at least one virtual machine respectively forms an isolated execution environment, said each of the at least one hardware device and said each of the at least one virtual machine being configured to communicate with each other via the software layer;

generating, by the software layer, a unique ID associated with a request for a result; committing, by the software layer, to the unique ID;

transmitting, by the software layer, to a data source a request for data, to trigger the data source to generate and return the result and to generate multiple, independent, authenticity proofs of the result by leveraging at least one software attestation technique or at least one hardware attestation technique, wherein the data source is an external device which is remote to the apparatus and wherein the multiple, independent, authenticity proofs are generated in cooperation with the external device;

verifying the multiple, independent, authenticity proofs; and transmitting to a remote application the returned result and the verified authenticity proofs, wherein a hardware device or virtual machine is configured to run at least one custom application for leveraging hardware and/or software attestation techniques, wherein the request for the result comprises a request for a configuration of the multiple, independent, authenticity proofs.

* * * * *